Dec. 4, 1934. M. W. OLSEN ET AL 1,982,827
METHOD OF TURNING EGGS DURING THE INCUBATION OF THE SAME
Filed Aug. 4, 1930 2 Sheets-Sheet 1

Inventors
M. W. Olsen
and
H. T. Baker
By M. Talbert Dick
Attorney

Dec. 4, 1934.   M. W. OLSEN ET AL   1,982,827
METHOD OF TURNING EGGS DURING THE INCUBATION OF THE SAME
Filed Aug. 4, 1930   2 Sheets-Sheet 2

Inventors
M. W. Olsen
and
H. T. Baker
By M. Talbert Dick
Attorney

Patented Dec. 4, 1934

1,982,827

UNITED STATES PATENT OFFICE 1,982,827

METHOD OF TURNING EGGS DURING THE INCUBATION OF THE SAME

Marlow W. Olsen, Harlan, Iowa, and Harold T. Baker, New Brunswick, N. J.

Application August 4, 1930, Serial No. 472,965

3 Claims. (Cl. 119—44)

This invention relates to the turning of eggs during incubation and is a companion to our Patent No. 1,917,389, issued July 11, 1933.

The principal object of this invention is to provide a more efficient and successful method of turning eggs during incubation, whereby a hatch of fowls from the eggs so turned will be of a percent approaching the high percent of hatches obtained by setting hens.

A further object of our invention is to provide an improved method of turning eggs during incubation of the same, whereby mal-positions of the fowls inside the eggs will be eliminated and deformed and crippled fowls when hatched will be prevented.

Figure 1:
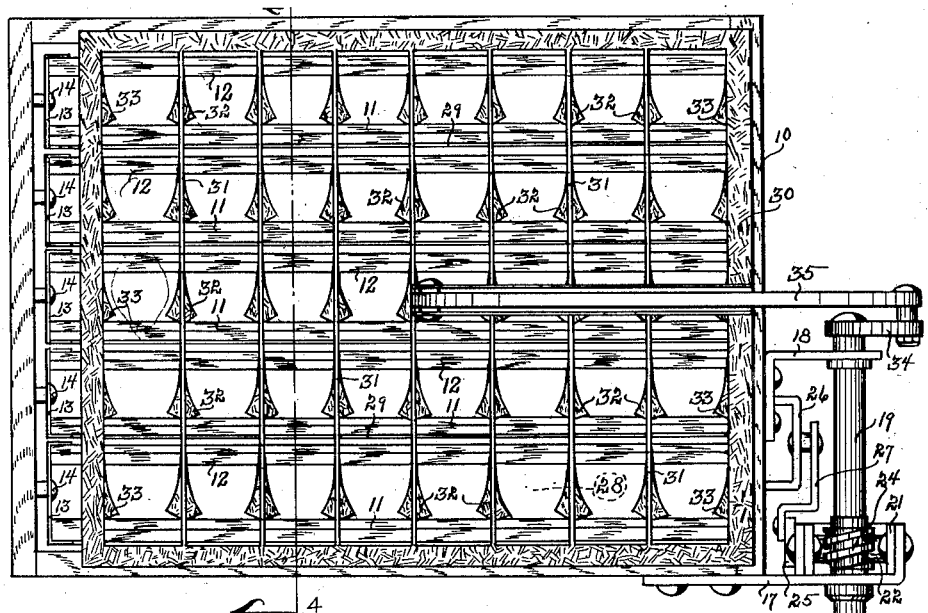
Fig. 1 is a top plan view of our complete egg supporting and turning device ready for use.

In order to appreciate this invention we must consider the embryo fowl inside its shell and its growth of development throughout incubation. The embryo fowl develops its system for using air, food and water while it is inside the shell. The egg is constructed in such a way that the part of the yolk where the germ spot is located is lighter than the opposite side, so that when the egg is at rest, the yolk turns over so that the embryo is always at the top. This line of gravity, of "up and down", is one of the two guides to location for the embryo, the other guiding point being the air cell. These two points of up and towards the air cell are just as important to the embryo fowl as up and to the light are to plants.

After the embryo begins to develop we find the fowl lying on the germ spot straight across the egg with its back up and its left side to the air cell. Later the fowl's head turns to the left side and the body turns to its left side. During this progress the embryo is receiving nourishment by sending out blood vessels on the surface of the yolk and has also developed a membrane on the surface of the yolk connected with the blood vessels, which digest the yolk food and the nourishment is then taken into the blood vessels and carried to the embryo fowl.

On the fifth day the fowl needs more oxygen than it can get from the liquids of the egg, so it begins to develop a temporary breathing system. A water supply is also an essential to the embryo fowl. To this end the embryo develops two sacs or coverings which comes out from the abdomen at the navel. These two sacs cover the fowl, one inside the other. The inside sac, which covers the fowl's body is filled with $H_2O$ that is drawn from the albumen of the egg, so the fowl is floating in this sac of water.

Just outside this water sac is the outer sac and between the two is growing out another membrane, a pear-shaped sac which draws up and towards the air cell, pushing and stretching out the outside sac as it goes until it reaches the inside shell membrane. This membrane that is growing out and going to the inside shell membrane is a breathing system which supplies the fowl with air. These sacs will mix together on or about the fourteenth day and the fowl will have reached such a length that it can no longer remain across the egg, and, therefore, swings around with its body the long way in the egg. Gravity plays an important part in the changing position of the embryo in the egg from crosswise to lengthwise, and the beak of the fowl will be the highest point in the egg. By forcing the egg to remain with the large end, containing the air cell down, the extra membranes and the fowl are misplaced. Only a very small percentage of fowls can hatch when eggs have remained in this position for any length of time.

It is because of these changes inside the egg that proper turning and positioning of the eggs are necessary in order that the tension and strain on certain tissues may be changed.

The turning of the eggs also balances the air circulation and equalizes the temperature. Improper positioning of the eggs causes misplacement of the embryo within the egg, while improper turning causes deformed and crippled fowls. By our method the eggs will be correctly positioned and moved during incubation. The mechanical device herein discussed illustrates one way of accomplishing our method.

We have used the numeral 10 to designate the rectangular frame of the invention. Rotatably mounted in this frame are a plurality of pairs of spaced apart parallel egg supporting and tilting bars. We have designated the two bars that make up each pair of bars by the numerals 11 and 12, respectively. Each of the bars 11 and 12 that make up a pair of bars is spaced apart and secured to end members 13 by suitable means. The numeral 14 designates a headed pin loosely extending through the central portion of each of the end members 13 and rigidly secured to the frame 10. By this construction each pair of spaced apart egg supporting and tilting bars 11 and 12 will be rotatively mounted in the frame 10, as shown in the drawings. Integrally formed on each of the end members adjacent the right side of the frame 10 is a downwardly extending arm 15. Pivotally secured to the free end portions of all of these arms 15 is an operating bar 16, as shown in the drawings. By reciprocating this bar 16, the arms 15 will be moved forwardly and backwardly, thereby tilting or rocking each pair of egg supporting bar members. The numerals 17 and 18 designate two bracket members spaced apart and secured to the frame 10. Rotatably mounted in these two bracket members and extending transversely to the bars 11 and 12 is a shaft 19. The numeral 20 designates a crank handle for manually rotating the shaft 19. It will here be noted that this shaft 19 is located outside of the frame 10 and to the right side of the same.

We have used the numeral 21 to designate a downwardly extending U-shaped bearing member secured at the free end of the bracket member 17 and embracing the shaft 19. Rotatably mounted in the bearing member 21 and below the shaft 19 is a second shaft 22, positioned transversely of the shaft 19.

The numeral 23 designates a worm gear on the shaft 22 and secured against independent movement relative to the shaft 22. This worm gear 23 is in engagement with a worm gear 24 rigidly secured on the shaft 19. Rigidly secured on one end portion of the shaft 22 is a crank arm 25. Secured by rivets or the like to the bar 16 is a U-member 26. The numeral 27 designates a link having one end pivotally secured to the U-member 26 and its other end rotatably secured to the crank arm 25.

By such a construction when the crank handle 20 is rotated the bar 16 will be reciprocated and each pair of egg supporting bars will be rocked from a normal, nearly horizontal, position. Due, however, to the reduction worm gears 23 and 24, it will require several rotations of the crank handle 20 to rock the pairs of egg supporting bars from one extreme position in their travel to their other extreme position of travel.

Figure 6:
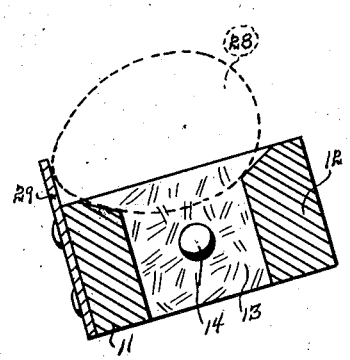
Fig. 6 is an enlarged sectional view of one of the pairs of egg supporting and tilting bars showing the position of the eggs when the same is tilted to an angle to the horizontal.
Figure 7:
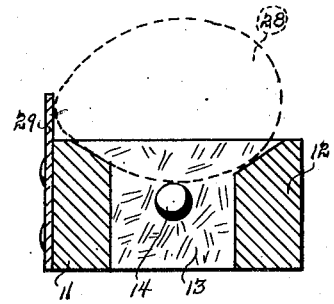
Fig. 7 is an enlarged sectional view of one of the pairs of egg supporting and tilting bars showing the position of the eggs when the bars are in a near horizontal position.

The eggs to be incubated are placed in a row on each pair of supporting bars 11 and 12, and each egg bridges the gap between the two bars as shown by dotted lines in Fig. 6 and Fig. 7. In order that the eggs may be properly supported on the bars 11 and 12, we have caused the upper inner marginal edge of each of the bars to be beveled to more closely conform to the outline of the periphery of the eggs. Also by this construction the eggs which are designated by the numeral 28, have more surface contacting and engaging the bars 11 and 12.

When placing the eggs on the bars 11 and 12, the large end of the egg should contact the bar 12 which is the bar that extends above the plane of the bar 11 when the operating bar 16 is pushed forwardly. Secured on the outer side of each of the bars 11 and extending to a height considerably above the bar to which it is secured, is an elongated strip 29 which aids in holding the eggs on the bars 11 and 12 during the rolling and tilting of the eggs.

By a space existing between the bars 11 and 12 the egg resting on the bars will not be contacted to such an extent as to prevent its proper breathing through the egg shell. This construction also permits the necessary heat to engage the eggs completely around the same.

Figure 2:
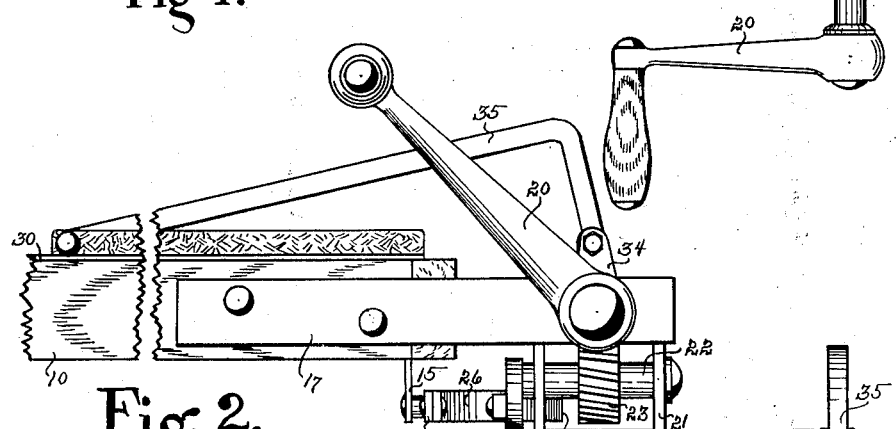
Fig. 2 is a rear end view of a portion of the invention and more fully illustrates its construction.
Figure 3:
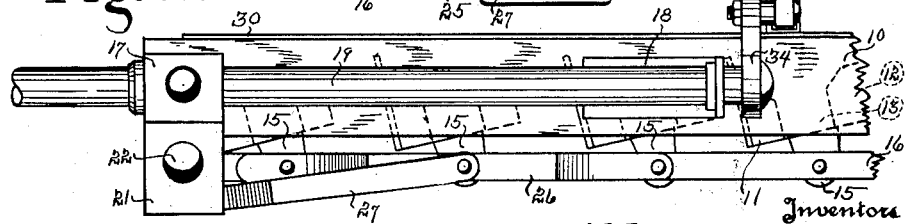
Fig. 3 is a side view of a portion of the operating mechanism of the invention.
Figure 4:
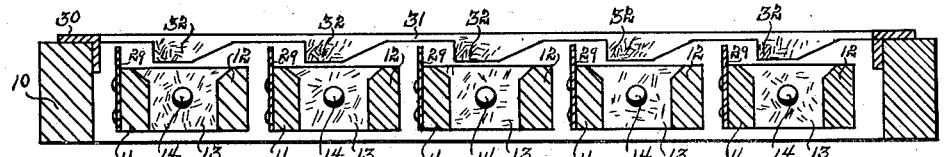
Fig. 4 is a cross sectional view of the invention taken on line 4—4 of Fig. 1.

Slidably mounted on the top of the frame 10 is a rectangular frame of L-construction which we have designated by the numeral 30. This frame 30 has its lower portion extending into and engaging the side walls of the frame 10. Due to the fact that its length is less than the length of the frame 10, it is permitted a certain longitudinal reciprocation in and on the frame 10. The numeral 31 designates a plurality of spaced apart bars secured to and extending completely across the frame 30. These bars are transversely arranged relative to the bars 11 and 12 and are designed to rest between every two adjacent eggs on each of the pairs of egg supporting and tilting bars 11 and 12. On the bottom of each of the bars 31 are a plurality of pairs of downwardly and outwardly extending flared members 32 extending away from each other, as shown in Fig. 1. These flared members are located directly above the space between the bar members 11 and 12 and are designed to rest at the two sides of each of the eggs. Similarly flared members 33 are formed on the two lower side portions of the frame 30. Rigidly secured on the forward end of the shaft 19 is a crank arm 34. The numeral 35 designates a link having one end pivoted by suitable means to the frame 30 near its center and its other end rotatably secured to the crank arm 34. This link 35 is bent at a right angle as shown in Fig. 2, in order to rotate with the crank arm 34 without engaging and binding on the frames 10 and 30.

Figure 5:
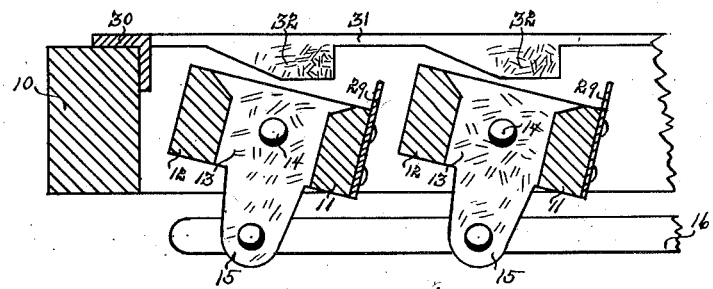
Fig. 5 is a cross sectional view of the invention showing the pairs of egg supporting bars in a tilted condition, and is taken along the line 4—4 of Fig. 1, looking in the opposite direction.

By this arrangement of parts when the crank handle 20 is rotated, the frame 30 will move forwardly and backwardly at each complete revolution of the shaft 19. This procedure will cause the flared egg engaging members 32 and 33 to engage the sides of the eggs 28 and roll them forwardly and backwardly on the supporting bars 11 and 12. By the members 32 and 33 being of flared construction, i. e., extending downwardly and outwardly they will more properly engage the side of the egg and cause it to rotate when the frame 30 is reciprocated. As we have heretofore seen the eggs make good contact with the tops of the bars 11 and 12 and any moving of the eggs on the bars 11 and 12 by the members 32 and 33 will insure the successful rolling of the egg sidewise. The rotating of the shaft 19 will also slowly reciprocate the bars 16 which will cause each pair of egg supporting bars to tilt to an angle to the horizontal, as shown in Fig. 5 and Fig. 6. This longitudinal tilting of the eggs at times is very desirable as we have heretofore seen, and this rocking procedure by the invention is so designed that the large end of the egg is the end that is elevated during the rocking and changing of the longitudinal position of the egg. Due to the reduction gears a longitudinal rocking of the eggs 28 is much slower than the rolling of the eggs by the reciprocation of the frame 30.

This means that sometimes the frame 30 will be reciprocated when the pairs of egg supporting bars are in a nearly horizontal position, and sometimes when the egg supporting bars are rocked to various angular positions relative to the horizontal. As the egg supporting bars are rocked to various positions the eggs will roll, in each instance differently upon them, due to the fact that the eggs will be variably engaging the bars 12 relative to the bars 11.

In other words the eggs will roll quite normally on the bars 11 and 12 when the bars 11 and 12 are resting in approximately the same horizontal plane, but when the bars 12 are at a higher plane than the plane of the bars 11, the greater portion of the weight of the eggs will be resting on the bars 11 and due to this more successful contact with the bars 11 than the bars 12, the lower ends of the eggs will act as the traction to the supporting bars and will make a greater amount of rotation when the frame is reciprocated than when the bars 11 and 12 are in a level condition and the frame 30 is reciprocated.

This result is obtained by the lower end of the eggs or the ends of the eggs engaging the bars 11 being much smaller in circumference than the ends of the eggs engaging the bars 12, and provides a changing ratio between the two motions so that the eggs are given an irregular motion each time the shaft 19 makes one complete revolution.

If it is desired a prime mover may be operatively connected to the shaft 19, but whatever method may be used the shaft 19 should be intermittently rotated many times each day. The means that reciprocates the frame 30 should be so constructed that the rotating movement given the eggs will be less than a complete revolution between alternations.

From the foregoing it will be seen that our method of turning eggs during the incubation of the same consists of first, positioning the egg so that its air cell will be at a higher plane than its small end, second, the intermittent longitudinal rocking of the egg to bring the air cell at even a greater height above its small end, third, the simultaneous rotation of the egg, and fourth, an irregular amount of rotation of the egg during each alternation.

We claim as our invention:

1. The method of positioning and turning eggs during the incubation of the same, consisting in the holding of the eggs so that their larger ends are always maintained above their smaller ends, the rocking of the eggs at various times about horizontal axes, between positions with their longitudinal axes nearly horizontal, and positions with their longitudinal axes at considerable angles to the horizontal, and the simultaneous rolling of the eggs sidewise during the rocking of the eggs so that the angle through which it rolls is greater, the greater the angle between the longitudinal axes of the eggs and a horizontal plane.

2. The method of positioning and turning eggs during the incubation of the same, consisting in the holding of the eggs so that their larger ends are always maintained above their smaller ends, the rocking of the eggs at various times about horizontal axes, between positions with their longitudinal axes nearly horizontal, and positions with their longitudinal axes at considerable angles to the horizontal with rocking movements of the eggs following a successive alternate series of steps of increasing and decreasing the angle of the longitudinal axes of the eggs relative to the horizontal for progressively changing the angle of the longitudinal axes of the eggs relative to the horizontal plane, and the simultaneous rolling of the eggs sidewise during the rocking of the eggs with the rolling action being much greater than the rocking action imparted to the eggs, but with the rolling action and rocking action in a relative ratio consistent with each other, whereby the angle through which the eggs roll is greater, the greater the angle between the longitudinal axes of the eggs and a horizontal plane.

3. The method of positioning and turning eggs during the incubation of the same, consisting in the holding of the eggs so that their larger ends are always maintained above their smaller ends, the rocking of the eggs at various times about horizontal axes, between positions with their longitudinal axes nearly horizontal, and positions with their longitudinal axes at considerable angles to the horizontal, and the simultaneous rolling of the eggs sidewise during the rocking of the eggs with the rolling action being much greater than the rocking action imparted to the eggs, but with the rolling action and rocking action in a relative ratio consistent with each other, whereby the angle through which the eggs roll is greater, the greater the angle between the longitudinal axes of the eggs and a horizontal plane.

MARLOW W. OLSEN.
HAROLD T. BAKER.